United States Patent [19]

Vio

[11] 4,155,405

[45] May 22, 1979

[54] PREVENTION OF INFLOW OF WATER INTO WELLS OR SHAFTS WHICH HAVE ALREADY BEEN DRILLED OR ARE BEING DRILLED

[75] Inventor: Lino Vio, Mazeres Lezons, France

[73] Assignee: Societe Nationale Elf Aquitaine (Production), Paris, France

[21] Appl. No.: 860,827

[22] Filed: Dec. 15, 1977

[30] Foreign Application Priority Data

Dec. 30, 1976 [FR] France ................................ 76 39554

[51] Int. Cl.[2] .......................................... E21B 33/138
[52] U.S. Cl. .................................... 166/295; 166/300; 405/264
[58] Field of Search ............... 166/270, 294, 295, 300; 61/36 C

[56] References Cited

U.S. PATENT DOCUMENTS

| | | | |
|---|---|---|---|
| 3,302,717 | 2/1967 | West et al. | 166/295 X |
| 3,759,197 | 9/1973 | Bracke | 61/36 C X |
| 3,795,276 | 3/1974 | Eilers et al. | 166/295 |
| 4,009,755 | 3/1977 | Sandiford | 166/295 X |

*Primary Examiner*—Stephen J. Novosad
*Assistant Examiner*—George A. Suchfield
*Attorney, Agent, or Firm*—Ostrolenk, Faber, Gerb & Soffen

[57] ABSTRACT

Prevention of inflow of water into the wells or shafts which are already drilled or are being drilled, by means of a polyacrylamide gel cross-linked with a dialdehyde is disclosed. An aqueous solution of non-hydrolyzed polyacrylamide, with a molecular weight higher than 2,000,000 and with a pH of at least 6.5, is used. A progressive plugging or clogging of the water-productive zone is obtained and the gel which is formed is stable over time and does not undergo any syneresis.

16 Claims, No Drawings

PREVENTION OF INFLOW OF WATER INTO WELLS OR SHAFTS WHICH HAVE ALREADY BEEN DRILLED OR ARE BEING DRILLED

The invention is concerned with preventing inflow of water into shafts or wells which have already been drilled or which are in the course of being drilled into the ground; it is more particularly concerned with drilling operations which are carried out for exploiting oil or gas deposits.

As regards ground drillings and particularly as regards those which are carried out for the exploration or exploitation of petroleum or natural gas deposits, it is very often necessary to avoid inflow of water into the drilled shafts. This has resulted in a considerable amount of work and development being carried out, because it is of great technical importance. Among the solutions which have so far been used are various cements, crosslinkable resins, silica gel, polymers with ionic crosslinking agents, certain of them have given satisfaction. However, such solutions often had disadvantages, such as irreversibility of the treatment or the necessity of successive injection of the components which establish a gel, which necessity is shown by a heterogeneous mixture of the injected agents and therefore a mediocre effectiveness of the gel which is formed. The problem of obtaining a composition which is capable of suitably shutting off or blocking the pores and fissures in a formation or zone where water is produced so as to prevent filtration of water into the shafts consequently still exists.

The present invention provides an improved solution by the application of a gel which is formed in situ from a polymer of acrylamide, crosslinked by means of a dialdehyde. Although it is known to use compositions which are based on polyacrylamide and dialdehyde in drilling operations or for stabilizing certain soils, the specific application for the plugging of the fissures and pores in order to prevent the inflow of water has not been heretofor successfully achieved. In actual fact, where the attempt has been made to stabilize dunes or efficiently to agglomerate grains of sand by means of a gel formed by crosslinking of polyacrylamides with a dialdehyde, particularly glyoxal, in the manner as indicated in Belgian Pat. No. 757,161, this treatment has not, however, made it possible to make the agglomerated material impermeable to water. On the contrary, as stated in the second paragraph on page 6 of the aforementioned patent, the aggregates thus formed enable the terrain to "breathe" and facilitate the penetration into the ground of rain or irrigation water which passes through the interstices of the agglomerates. In the application of the present invention, it is necessary to prevent any penetration of water into the shafts or wells which have already been drilled or are in the course of being drilled. It seems that this result was able to be achieved by the use of a gel of polyacrylamide and glyoxal, the polyacrylamide being partially hydrolyzed and the gelling operation being carried out at a strictly acid pH value, especially of 3 or below, in accordance with U.S. Pat. No. 3,795,276; however, at the time, the purpose seems to be out of date because, if the impermeabilization is very strong, soon after the application, the gel eventually develops, undergoing the syneresis, which is shown by the weakening of the bond which it formed in the pores and fissures. The present invention has enabled these defects of the polyacrylamide gels according to the prior art to be corrected by a specific choice of operating conditions.

The process according to the invention, which consists in the impregnation of the ground to be made impermeable with a dilute aqueous solution of non-hydrolyzed polyacrylamide to which is added a dialdehyde, is characterized in that the polyacrylamide has a molecular weight of at least 2,000,000 and preferably from 4,000,000 to 8,000,000, and the pH of the solution being at least 6.5.

According to the prior art, referred to above, the molecular weight of the polyacrylamide which is used does not exceed 1,500,000, because it was feared that too viscous solutions would be obtained with higher molecular weights, which solutions cannot be easily manipulated as explained in the Belgian patent in the first paragraph on page 3; the U.S. patent mentions polyacrylamides having molecular weights from 2,000,000 to 3,000,000, in Examples 2 and 4, but these examples are concerned with partially hydrolyzed polymers, the behavior of which is very different from that of the non-hydrolyzed polymers in accordance with the present invention.

The invention arises from the unexpected discovery that it is possible to obtain with polyacrylamides of high molecular weights, for example, from 2,000,000 to 8,000,000, solutions which can be perfectly handled but which, in time, provide more resistant gels, provided that the concentration, the pH and the amide/aldehyde ratio are adapted to each given aldehyde and to each given molecular weight in such a way that the transformation of the solution into an elastic gel requires a time of at least 6 hours, or better still 12 to 72 hours.

Furthermore, in accordance with a preferred feature of the invention, the impermeabilization of the soil or ground is achieved in a time which is longer than that in the prior art, namely, in 24 hours or more; it is to be noted that this operation takes less than 1 hour in the prior art referred to above.

As indicated above, it is important to regulate the parameters as regards the gelling as a function of the nature of the polyacrylamide and of the dialdehyde: later in the present specification, the person skilled in the art will find indications which will enable him correctly to select these parameters so as to achieve a clogging of the pores and fissures in the ground with a gel which remains stable for a long period and does not provide any danger of loss of water as a function of time, of becoming hard or of ceasing to become fluid-tight.

In a general manner, the dialdehydes which can be used according to the invention are water-soluble and of the type

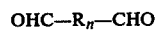

in which R is a divalent hydrocarbon radical, capable of comprising 1 to 4 carbon atoms and preferably $CH_2$; n may be from 0 to 6 or better still from 0 to 3. Glyoxal

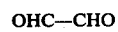

is particularly recommended. When the dialdehyde is present in the form of an oligomer, as is the case, for example in the trimer of glyoxal, it is practical to use such an oligomer.

As regards the polyacrylamide, it may be used in the form of a homopolymer of the amide $$CH_2=CR-CONHR'$$

in which R may be H or $CH_3$, R' being H, $-CH_3$, $-CH_2OH$, ethyl, propyl, isopropyl, butyl, isobutyl or possibly another alkyl, preferably having at most 12 carbon atoms. It is likewise possible to use copolymers of such an amide with another unsaturated compound, as for example styrene, vinyl acetate, alkyl acrylate or hydroxylalkyl acrylate, alkyl methacrylate or hydroxyalkyl methacrylate, acrylonitrile, acrolein or others. The acrylamide polymers which may be employed in the process according to the invention should have a molecular weight which is greater than $2 \times 10^6$, and which is preferably between 4 and $8 \times 10^6$; they should not be ionic or, at most, they should contain a molar quantity of ionic monomer which is smaller than 10%, or better still smaller than 5%.

The preparation of the solutions which are intended for the gelling within the earth or material into which they are injected comprises the dissolution in water of the selected polymer, the addition of the appropriate proportion of dialdehyde, the homogenization of the medium and the adjustment of the pH to the desired value. The water may be soft or salty, particularly sea water or deposit water, because the presence of salt does not impair the gelling operation. The adjustment of the pH can be effected by means of a mineral base, an amine, an alkali phosphate or carbonate or any other basic compound which does not react with the substances which are present. In addition, it may be expedient to add an inert loading agent to the solution.

In one particular embodiment of the novel process, the gellable aqueous solution is formed in situ with the ground water to be treated. In this case, the mixture of polyacrylamide with dialdehyde is prepared in the form of a suspension in a non-aqueous liquid, particularly a water-free hydrocarbon. For this purpose, the adequate quantities of polyacrylamide, dialdehyde and a basic agent for the adjustment of the pH are dispersed in the said liquid. This suspension, to which may possibly be added an inert filler, is injected into the ground which is to be made impermeable, and the particles of its components react with the water which is present in order to form a sealing gel. In this embodiment, it is highly practical to use the dialdehyde in the form of a solid oligomer which can be more easily dispersed in the non-aqueous liquid. Consequently, the trimer of glyoxal is particularly useful for this purpose.

For the injection of the solution or suspension in accordance with the invention into the drilling shaft or well, it is possible to make use of the pumps which are normally employed on drilling rigs; the wells or shafts are then closed for the time necessary for the gelling operation, this time having been established in advance by tests carried out on the surface.

In the preparations which are about to be described, the polymer is generally used in a concentration of about 0.2 to 1% weight/volume, the concentrations in the region of 0.5% and especially 0.35 to 0.65% usually being the best.

One of the factors which is essential in the gelling procedure in accordance with the invention is the number of aldehyde groups (—CHO) which are used in the presence of the polymer per amide group (—$CONH_2$) which is present. The gel is generally formed more rapidly and presents the best characteristics when the ratio between the two groups under consideration is stoichiometric; in other words, this result is obtained with 1 mole of dialdehyde to 2 moles of amide, the ratio of moles of dialdehyde to mole of amide then being 0.5. Nevertheless, a highly acceptable gelling effect can still be achieved with an excess or a certain deficiency of aldehyde; accordingly, good gels can be obtained in a reasonable time if the dialdehyde has the proportion of 0.2 to 1 mole per mole of amide of the polyacrylamide. As a general rule, for molar ratios of dialdehyde/amide higher than 0.5, the gelling procedure is more rapid and more complete, while it is slower when this ratio is lower than 0.5. With ratios lower than 0.2, the gelling procedure takes place very slowly and several days are necessary in order to obtain the gel.

Contrary to the prior art which has been referred to, the gelling operations in accordance with the present invention may take place at pH values which are between 6.5 and 7, but the preferred range is highly dependent on the nature of the dialdehyde being used. Thus, when using glyoxal, the best results are obtained for pH values from 7.5 to 8.5 at 20° C., while with glutaraldehyde, the best results are obtained with pH values in the region of or equal to 10.5. The criterion as regards the adoption of the appropriate pH value makes it possible better to understand the fundamental differences between the present invention and the prior art: thus, it is possible to see, from pages 7 and 8 of the Belgian patent which has been referred to, that gelling times of 14 minutes and 19 minutes are obtained for pH values of 9.2 and 8.5, respectively, with polyacrylamides of molecular weights from 50,000 to 1,500,000, crosslinked with glyoxal; it is now a fact that, with the polyacrylamides having molecular weights from 2,000,000 to 8,000,000 in accordance with the invention, there is selected, within the pH range of 6.5 to 8.5, a value such that an elastic gel is only formed after about 24 hours. According to the invention, the gelling effects which are too rapid and too complete and at a too high pH value are avoided because they lead to gels which are subject to syneresis and as a result, lose their sealing property after a few days.

The non-limiting examples which are indicated below illustrate certain aspects of the present invention.

EXAMPLE 1

Influence of the pH

Polyacrylamide with a molecular weight of 7,600,000 is dissolved in water so as to form an 0.5% by weight solution of this polymer; with the solution at 20° C., it has added thereto a quantity of glyoxal corresponding to 0.5 mole of this dialdehyde per unit of —$CONH_2$. The initial pH value of this solution is about 3.4; to portions of the solution are added a solution of 10% $Na_3PO_4$ so as to raise the pH to the desired experimental values. The following checks are thus carried out on portions thus obtained with a different pH value.

PH
  6.5—becomes viscous only after 4 days. Slight gelling after 6 days.
  7.5—slight gelling after 24 hours. Gel elastic after 4 days, unchanged after 6 days.
  9—gel very elastic after 2½ hours. Very firm after 24 hours and initiation of syneresis; this continues after 4 days.
  10.5—immediate gelling; commencement of syneresis after 3 hours; gel is compact but non-elastic, having lost considerable water, after 24 hours.

It is seen that the gelling time varies quickly as a function of the pH value and that, in order to obtain a stable gel, it is appropriate to carry out crosslinking at pH values which are not beyond 8.5.

EXAMPLE 2

Influence of temperature

The solution of Example 1 was subjected to crosslinking at 48° C. in sealed tubes with three different pH values: 6.5, 7 and 7.5. The results are substantially the same as above, the raising of the temperature to 48° C. apparently not having appreciably modified the speed of the crosslinking or the quality of the gel. An experiment at 80° C. with a pH value of 9 gives results which are comparable with those of Example 1; the gel, left for 24 hours at 80° C., does not become retracted, but it becomes slightly yellowish.

EXAMPLE 3

Influence of the concentration of polyacrylamide

In the same manner as in Example 1, a series of solutions is prepared which contain 0.025 to 1% of polyacrylamide with a molecular weight of 7,600,000; the glyoxal/amide ratio is 0.5, as previously and, the temperature 20° C.

The tests are carried out in the first case at pH 7.5 and in the second case at pH 11.

The polymer concentrations of the portions subjected to the tests are 0.025%, 0.05%, 0.1%, 0.2%, 0.3% and 1%.

Regardless of the pH value and the duration of the test, no appreciable gelling is obtained for concentrations which are lower than 0.2%.

EXAMPLE 4

Purpose of the dialdehyde/amide ratio

To a solution of the same polyacrylamide as in the foregoing examples are added variable proportions of glyoxal so as to have a dialdehyde/amide ratio of 1–0.5–0.25–0.1–0.05. The tests are carried out at ambient temperature.

It is found that, with a pH value of 7.5, the glyoxal/amide ratios of 1 and 0.5 produce a gel after 4 days, and no gelling action has occurred in the solutions which have the ratios 0.05, 0.1 and 0.25. For the pH value of 11, there is established an immediate gelling effect with the ratios 0.25–0.5 and 1, and the gels immediately commence to be subjected to syneresis. Using the ratios of 0.05 and 0.1, only a very viscous liquid is obtained.

EXAMPLE 5

Influence of the molecular weight of the polymer

To 0.5% solutions of polyacrylamide of varying molecular weights are added glyoxal at the rate of 0.5 mole per unit of amide; the pH is adjusted to 9, at ambient temperature. The following observations were made.

Molecular weight
- 7,000,000—The gel is formed after 1 hour and the syneresis starts after 24 hours.
- 2,000,000—A very elastic gel is formed after 1 hour; it becomes rigid the following day and only starts to lose water after 6 days.
- 1,300,000—Gives only a very slightly rigid gel, not suitable for making the ground impermeable.
- 300,000—No gelling has occurred after 1 week.
- 9,000—No gelling has occurred after 1 week.

EXAMPLE 6

Crosslinking of copolymers

In Example 1, the polyacrylamide is replaced by a copolymer of acrylamide and vinyl acetate with a molecular weight of 5,000,000. It is then found that a good crosslinking is produced when the pH is adjusted to 10.

The same result is obtained with the copolymer consisting of acrylamide and 2-hydroxyethyl methacrylate.

It is seen that the copolymers are quite suitable, but necessitate a higher pH value than the acrylamide homopolymer.

EXAMPLE 7

Use of glutaraldehyde

In the tests according to Examples 1 to 4, the glyoxal is replaced by the equivalent quantity of glutaraldehyde.

It was then found that an elastic gel is obtained only after 14 days with the pH value of 9, whereas with lower pH values, the crosslinking does not occur.

On the other hand, a suitable elastic gel is obtained at a pH of 10.5 in 24 hours and it remains stable, becoming stronger as a function of time.

In other words, the glutaraldehyde requires a pH of 10.5, instead of a pH of 7.5 to 8 as with glyoxal.

Tests similar to those of Example 3 showed that here the best gel is obtained with a polyacrylamide concentration of 0.5%; below 0.3%, there is no crosslinking, while the syneresis starts at 1%.

It is always with a pH of 10.5 that the glutaraldehyde/amide ratios of 0.5 to 1 give good results; it would be the same with ratios of 0.1 to 0.25, but the crosslinking is slowed down. A gel may even be obtained with a ratio of 0.05.

EXAMPLE 8

Plugging of a porous and fissured medium

A column with a length of 40 cm and a diameter of 2.5 cm is lined with pieces of pumice stone with an average size of about 1 cm.

When a 1% solution of polyacrylamide with a molecular weight of 4,000,000, at pH 7.5, is poured into this column, practically no difference is observed as regards the pressure at the upstream end and downstream end of the column through which the said solution passes.

The experiment is then restarted with the same solution of polyacrylamide to which is added a quantity of glyoxal corresponding to 0.5 mole of dialdehyde per function of the amide which is present. After this new solution has remained standing for 6 hours in the column, it is found that there is practically no resistance to the passage of the liquid through the said column.

The column, filled with this said solution is then left standing for 3 days: there is then formation of a gel and, in order to clear the column, it is necessary to apply at the upstream end a pressure of 4 bars.

It is thus apparent that the polymer solution containing glyoxal, is capable of being perfectly handled for many hours, which means that it could be easily injected into a drilled well or shaft; the gelling effect is progressive; it starts to become apparent after 24 hours and it achieves the desired plugging effect after about 72 hours.

EXAMPLE 9

Clogging of a porous medium

The experiment is carried out with a Hasler assembly, a sandstone core from the Vosges mountains, with a length of 30 cm and a diameter of 3.6 cm, permitting a water permeability of 160 millidarcy. It is possible without any difficulty to cause the circulation in this cell of an aqueous solution of polyacrylamide of a molecular weight of 4,000,000, at 0.3%, containing 0.5 mole of glyoxal per amide function. The pH of this solution is equal to 8. The cell, filled with this liquid, is then left standing for 3 days. It then becomes necessary to exert a pressure of 40 bars for several minutes in order to reestablish the liquid circulation. The permeability to water after this pressure has been applied remains very low and in the region of 15 millidarcy.

I claim:

1. Process for preventing the inflow of water into wells or shafts which have been drilled or which are being drilled by impermeabilizing the walls of the well or shaft with an aqueous polyacrylamide gel crosslinked in situ by an aqueous non-hydrolysed polyacrylamide of molecular weight of at least 2,000,000 and an amount of dialdehyde sufficient to gelify said polyacrylamide at a pH of at least 6.5, and permitting said introduced material to form an elastic gel resistant to synersis.

2. Process according to claim 1, wherein the molecular weight is in the range of 4,000,000 to 8,000,000.

3. Process according to claim 2, characterized in that the pH value, selected to be between 6.5 and about 11, is such that the time necessary for the formation of the elastic gel is at least 6 hours.

4. Process according to claim 3, wherein the time of formation of the elastic gel is of 12 to 72 hours.

5. Process according to claim 1, in which the polyacrylamide is a homopolymer of an acrylamide of the $CH_2=CR-CONHR'$ type, in which R is H or $-CH_3$, R' being H, $-CH_2OH$ or a $C_1$ to $C_{12}$ alkyl, or a copolymer of such an amide with another unsaturated compound, characterised in that the polyacrylamide does not contain more than 10% moles of an ionic monomer.

6. Process according to claim 5, wherein the polyacrylamide contains 0 to 5% moles of an ionic monomer.

7. Process according to claim 5, in which the unsaturated compound is selected from the group consisting of vinyl acetate, alkyl or hydroxyalkyl acrylate or methacrylate, acyronitrile and acrolein.

8. Process according to claim 1, in which the dialdehyde is of the formula $OHC-R_n-CHO$, in which R is a $C_1$ to $C_4$ divalent hydrocarbon radical, n being 0 to 6, characterised in that the crosslinking is effected with a quantity of dialdehyde such that the value of the molar ratio between dialdehyde and amide is from 0.2 to 1, so that the formation of an elastic gel does not occur before 6 hours but is produced in 6 to 72 hours.

9. Process according to claim 8, wherein n is 0 to 3.

10. Process according to claim 8, wherein the formation of the elastic gel takes place in 24 to 72 hours.

11. Process according to claim 1, in in which the concentration of polyacrylamide is 0.2 to 1% by weight/volume.

12. Process according to claim 11, wherein the concentration 0.35 to 0.65 of the polyacrylamide.

13. Process according to claim 1, in which the polyacrylamide is a homopolymer having a molecular weight from four to eight million, in a 0.35 to 0.65% aqueous solution having added thereto glyoxal at the rate of about 0.5 mole per amide group of the polymer, and the pH being 7.5 to 8.5.

14. Process according to claim 1, in which the polyacrylamide is homopolymer with a molecular weight from 4,000,000 to 8,000,000, in a 0.35 to 0.65% aqueous solution having added thereto about 0.5 mole of glutaraldehyde for each present amide group, and the pH being about 10.5.

15. Process according to claim 1, characterized in that the polyacrylamide to which dialdehyde is added is introduced through the shaft or well into the formation to be plugged, and is left standing until the gel has formed, after which the shaft or well is restored to normal functioning.

16. Process according to claim 1, characterized in that the polyacrylamide, the dialdehyde and a pH-adjusting agent are dispersed together in a non-aqueous liquid, and the dispersion formed is introduced into the formation to be plugged through the shaft subject to inflow of water, and then it is left there until a gel is formed with the water thus infiltrated.

* * * * *